United States Patent Office 3,062,834
Patented Nov. 6, 1962

3,062,834
PROCESS FOR PREPARING THIOPHENCAR-
BOXYLIC ACIDS AND THEIR ESTERS
Hans Fiesselmann, Erlangen, Germany, assignor to Farb-
werke Hoechst Aktiengesellschaft vormals Meister
Lucius & Brüning, Frankfurt am Main, Germany, a
corporation of Germany
No Drawing. Filed Apr. 9, 1959, Ser. No. 805,144
Claims priority, application Germany Apr. 12, 1958
3 Claims. (Cl. 260—332.2)

The present invention relates to thiophencarboxylic acids and their esters and to a process for preparing them.

I have found that thiophencarboxylic acids or their esters of the general formula

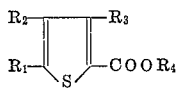

wherein $R_1$ represents a member selected from the group consisting of hydrogen, alkyl radicals of low molecular weight, aryl radicals, the carboxyl group and esterified carboxyl groups, $R_2$ represents a member selected from the group consisting of hydrogen, alkyl radicals, particularly low molecular weight alkyl radicals, aryl and acyl radicals, $R_3$ represents a member selected from the group consisting of alkyl radicals, particularly of low molecular weight alkyl radicals and substituted aryl radicals, and $R_4$ represents a member selected from the group consisting of hydrogen and a low molecular weight alkyl radical, can be obtained in simple manner by reacting in the presence of an acid condensation agent β-dicarbonyl-compounds of the general formula

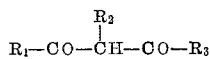

wherein $R_1$, $R_2$, and $R_3$ have the meanings given above, if desired in the form of their acetals or in the form of hydroxy- or alkoxy-methylene compounds, with thioglycolic acid or their esters of the general formula $$HS—CH_2—COOR_4$$

wherein $R_4$ has the meaning given above, esterifying in usual manner, preferably with low molecular weight aliphatic alcohols, the carboxyl groups present in the thus obtained mercaptal or carboxymethyl-mercapto-methylene compounds of the general formula

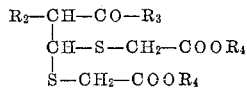

or

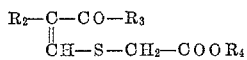

wherein $R_2$, $R_3$ and $R_4$ have the meanings given above, effecting ring closure by a treatment with alkaline condensation agents, and, if desired, saponifying the thus obtained thiophencarboxylic acid esters to form the free acids.

The β-dicarbonyl compounds that may be used as starting substances for the process of the present invention are often only available in the tautomeric hydroxymethylene form. The use of these derivatives is expedient in those cases, where the free β-ketoaldehydes are unstable.

The following compounds are mentioned by way of example: acetylacetone, butyrylacetone, valerylacetone, benzoylacetone, 3-methyl-acetylacetone, 3-ethyl-acetylacetone, 3-butyl-acetylacetone, 3-phenyl-acetylacetone, α-acetyl-propiophenone and α-butyryl-butyrophenone, acetyl-acetaldehyde-dimethylacetal, isovaleryl-acetaldehyde-dimethylacetal, hydroxymethylene - methyl - ethylketone, hydroxy - methylene - diethylketone, 1-hydroxymethylene-cyclohexanone-(2), 3-hydroxymethylene - heptanone-(4), hydroxymethylene - propiophenone, hydroxymethylene-p-methylacetophenone, hydroxymethylene-p-methoxy - acetophenone, methoxymethylene - acetophenone, ethoxymethylene-acetylacetone.

As far as β-diketo derivatives are used whose radical $R_1$ represents a low molecular weight alkyl radical, the reaction is suitably carried out in reacting 1 mol of a β-diketone with from 1 to 2 mols of thioglycolic acid in the presence of an acid condensation agent, preferably anhydrous hydrogen chloride. It is of advantage to draw off the reaction heat by cooling and not to allow the temperature of the reaction mixture to exceed 10° C. Instead of the anhydrous thioglycolic acid there may also be used the commercial acid having 80% strength.

The bis-acetic acid-mercaptols thus obtained may be used as such and without further purification as starting substances and may thus be esterified to bis-acetic acid ester-mercaptols. This is successfully carried out in the most simple manner by dissolving them in a low molecular weight aliphatic alcohol and in adding mineral acids, for example, sulfuric acid, as catalyst while operating advantageously at room temperature.

The ring closure to the thiophen-2-carboxylic acid esters is effected by a treatment of the bis-acetic acid ester-mercaptols with alkaline condensation agents. As such there are suitable especially hydroxides or alcoholates of the alkali metals. It is of advantage to operate in the presence of a solvent. As such there are suitable above all the low molecular weight aliphatic alcohols. The reaction is carried out at normal or at elevated temperature, preferably at the boiling temperature of the solvent used.

The reaction described above can be illustrated by the following formula scheme:

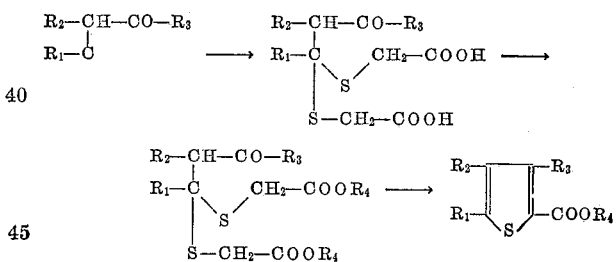

Instead of with β-diketones, the process according to the present invention can also be carried out with β-ketoaldehydes or their derivatives. For the reaction of β-ketoaldehydes or their acetals or hydroxymethylene or alkoxymethylene compounds, respectively, with thioglycolic acid, the presence of a solvent is not necessary. However, in some cases it may be of advantage to use such a solvent in order to better control the speed of the reaction. The reaction of β-ketoaldehydes with thioglycolic acid proceeds much easier so that it often suffices to add only catalytical amounts of acids, for example, hydrochloric acid, as hydrogen-ion donor in order to immediately initiate the reaction. In many cases, however, the addition of acid is not at all necessary as the acidity of the thioglycolic acid suffices to start the reaction.

The reaction can be carried out in most cases at room temperature, as the temperature of the reaction mixture often rises automatically due to the exothermic reaction. It may be useful to complete the reaction by heating to elevated temperatures, for example, to 80–120° C. In some cases, however, it may be necessary to operate from the beginning at higher reaction temperatures, for example, at temperatures between 40 and 150° C., in particular at temperatures within the range of about 60 to 120° C.

The bis-acetic acid-mercaptals thus obtained are not stable at highly elevated temperatures. When trying to distill them, they convert into unsaturated sulfides (carboxymethyl-mercapto-methylene compounds) while 1 mol of thioglycolic acid is split off. Both compounds are suitable for the further performance of the process.

The bis-acetic acid-mercaptals or the carboxy-methylmercapto-methylene derivatives are esterified according to the present invention with a low molecular weight aliphatic alcohol, for example, methanol, ethanol, isopropylalcohol, butanol. The crude products so obtained can be used without further purification. The esterification is preferably effected by dissolving the substance in the alcohol concerned to which have previously been added about 20–30% of water and 3–10% of concentrated sulfuric acid, and then allowing the solution to stand.

The esterified mercaptals or mercapto-methylene derivatives thus obtained in several steps may according to the invention also be prepared directly by the action of thioglycolic acid esters on β-ketoaldehydes. In this case one operates in the same manner as described above when carrying out the reaction with thioglycolic acid. In these cases the addition of catalytical amounts of acid is always necessary. It depends on the starting material and on the choice of the quantitative proportions of the reaction components used whether one or two molecules of the thioglycolic acid ester will add, i.e. whether there are formed mercaptals or unsaturated sulfides.

The esterified bis-acetic acid-mercaptals or the carbalkoxy-methyl-mercapto-methylene compounds, respectively, are caused to form a ring by the action of alkaline condensation agents.

Suitable compounds for this reaction are above all the hydroxides or alcoholates of the alkali metals. It is advantageous to operate in the presence of a solvent. As such solvents particularly the low molecular weight alcohols and also ether enter into consideration. The use of a methanolic sodium methylate solution proved to be particularly efficient. The reaction is carried out at room temperature or at an elevated temperature, preferably at the boiling temperature of the solvent used.

The thiophen-2-carboxylic acid esters thus obtained are colorless fluids or crystalline solids, which can be easily purified by distillation or recrystallization. They can be saponified in the usual manner, for example, by heating with an aqueous sodium hydroxide solution, if desired, without previous isolation, to form the thiophen-2-carboxylic acids.

The products obtained by the process of the present invention constitute valuable intermediate products. They can be converted in many ways into pharmaceutics or dyes.

Up to now thiophencarboxylic acids could be prepared only by the conversion of other, difficulty accessible thiophen derivatives. In a manner useful for preparations and industrial applications they can only be obtained by metallizing thiophen or its homologs and subsequently treating the compounds obtained with carbon dioxide, or by oxidation of alkyl or acyl thiophens. The process of the present invention allows of obtaining 2-thiophencarboxylic acids and their esters in good yields from simple, easily accessible starting substances by effecting a direct ring synthesis in a manner which can easily be carried out on an industrial scale.

The following examples serve to illustrate the invention, but they are not intended to limit it thereto:

EXAMPLE 1

(a) 1,1-Bis-(Carboxy-Methylmercapto)-2-Methyl-Butanone-(3)

20 grams (0.2 mol) of hydroxymethylene-methyl-ethylketone are heated to 25° C. together with 36.8 grams (0.4 mol) of anhydrous thioglycolic acid. Within 5 minutes the temperature rises to 45° C. When adding 2 droplets of concentrated hydrochloric acid, the reaction is more rapidly initiated. There is obtained a viscous, orange yellow oil which is subjected to further reaction without being purified.

(b) 1,1-Bis-(Carbomethoxy-Methylmercapto)-2-Methyl-Butanone-(3)

The 1,1 - bis(carboxy - methylmercapto) - 2 - methyl-butanone-(3) thus obtained is dissolved in 80 cc. of methanol, 30 cc. of water and 4 cc. of concentrated sulfuric acid are then added to the solution which is then allowed to stand. After some hours the solution is rendered turbid and the ester separates out as specifically heavier liquid. After the solution has been allowed to stand for 1 day, water is added, the oil is taken up in methylene chloride and the solvent is distilled off under a pressure of 12 mm. Hg while increasing the temperature to 100° C. There remain behind 52 grams of a greenish yellow oil which is further reacted without being purified.

(c) 3,4-Dimethyl-Thiophencarboxylic Acid-2-Methyl Ester 52 grams of the crude 1,1-bis-(carbomethoxy-methylmercapto)-2-methyl-butanone-(3) are mixed with 50 cc. of methanol, and to this mixture are added 200 cc. of a freshly prepared 2 N methanolic sodium methylate solution, whereby the temperature rises immediately to 37° C. Subsequently the whole is heated under reflux for 15 minutes. On cooling, the sodium salt of the split-off thioglycolic acid methyl ester separates in the form of a jelly. After the whole has been allowed to stand for 1 hour, 1 liter of ice-water is added and the precipitated 3,4-dimethyl-thiophencarboxylic acid-2-methyl ester is vacuum filtered. The yield is 19.5 grams. By recrystallization from methanol the compound is obtained in the form of colorless needles melting at 34° C.

(d) 3,4-Dimethyl-Thiophencarboxylic Acid-(2)

8.5 grams of 3,4-dimethyl-thiophencarboxylic acid-2-methyl ester are heated under reflux for 30 minutes with 50 cc. of a 4 N aqueous sodium hydroxide solution. After this period the oil is dissolved except some few flocks which are removed by filtration after cooling. Upon acidifying with dilute hydrochloric acid the acid precipitates. In this way there are obtained, after vacuum filtration and drying, 7.5 grams of 3,4-dimethyl-thiophencarboxylic acid-(2). It can be purified by recrystallization from dilute methanol and melts then at 187–188° C.

EXAMPLE 2

(a) 2-[(Carbomethoxy-Methylmercapto)-Methylene]-Butanone-(3)

To 10 grams (0.1 mol) of hydroxymethylene-methylethylketone there are added 10.6 grams (0.09 mol) of thioglycolic acid-ethyl ester and dissolved by heating to 70° C. Upon addition of 2 droplets of concentrated hydrochloric acid the temperature rises immediately to about 80° C. On cooling, the solution becomes turbid and water is separated out. The mixture is distilled in vacuo; under a pressure of 10.4 mm. Hg and at a temperature of 144° C. to 146° C. the unsaturated sulfide distills over and yields 14.7 grams. In a freezing mixture the oil solidifies. By recrystallization from ethanol the compound is obtained in the form of colorless little rodlets melting at 31° C.

2,4-dinitrophenyl-hydrazone: red scales, melting point 205–206° C.

(b) 3,4-Dimethyl-Thiophencarboxylic Acid-(2)

9.4 grams of 2-[(carbomethoxy-methylmercapto)-methylene]-butanone-(3) are dissolved in methanol and, after having added 30 cc. of a 2 N methanolic sodium methylate solution, the whole is heated under reflux for 15 minutes. 30 cc. of a 2 N aqueous sodium hydroxide solution are then added and the mixture is heated to the boil again for 30 minutes. For this operation an ascending tube is used as reflux cooler so that the major portion of the methyl-alcohol distils over. After having allowed the reaction solution to cool, water is added, and the solution is then acidified with dilute hydrochloric acid. There are obtained 4 grams of 3,4-dimethyl-thiophencarboxylic acid-(2). By recrystallization from dilute methanol the compound is obtained in the form of colorless prisms melting at 187–188° C.

EXAMPLE 3

(a) *1,1 - Bis-(Carboxy-Methylmercapto)-2-Methyl-Pentanone-(3)*

22.8 grams (0.2 mol) of hydroxymethylene-diethylketone are melted and mixed with 36.8 grams (0.4 mol) of anhydrous thioglycolic acid. The mixture becomes light yellow and viscous. By addition of 2 droplets of concentrated hydrochloric acid the reaction may be accelerated. The oil thus obtained is further reacted without purification.

(b) *1,1 - Bis-(Carbomethoxy-Methylmercapto)-2-methyl-Pentanone-(3)*

The crude 1,1-bis-(carboxy-methylmercapto)-2-methyl-pentanone-(3) obtained in the manner described before is dissolved in a mixture of 80 cc. of methanol and 30 cc. of water, and 4 cc. of concentrated sulfuric acid are added to the solution. After some hours the solution is getting turbid and segregates finally into 2 layers. After the solution has been allowed to stand for 1 day, water and methylene chloride are added to the content of the flask, the aqueous layer is extracted by shaking with methylene chloride, the collected methylene chloride extracts are washed, dried over sodium sulfate and the solvent is distilled off while applying at the end of the procedure a vacuum and increasing the temperature to 100° C. There are obtained 55.6 grams of 1,1-bis-(carbomethoxy-methylmercapto)-2-methyl-pentanone-(3) in the form of a thick yellow oil.

Upon the attempt to distil the substance in a high vacuum, there is obtained 2-[(carbomethoxy-methylmercapto)-methylene]-pentanone-(3) under separation of thioglycolic acid ester.

(c) *3-Ethyl-4-Methyl-Thiophencarboxylic Acid-2-Methyl Ester*

55.6 grams of crude 1,1-bis-(carbomethoxy-methylmercapto)-2-methyl-pentanone-(3) are poured, after having been diluted with 30 cc. of methanol, into a solution of 10 grams of sodium metal in 200 cc. of methanol. The mixture is then heated under reflux for 15 minutes, and, after it has been allowed to cool, there are added ice-water and dilute hydrochloric acid; there is obtained a yellow oil which is taken up with methylene chloride. After drying over sodium sulfate and distilling off the solvent, there are obtained 40 grams of an easily mobile, yellow liquid. In distilling it in vacuo, 22.6 grams of 3-ethyl-4-methyl-thiophencarboxylic acid-2-methyl ester pass over in the form of a yellowish liquid having a boiling point of 90–103° C. under 0.1 mm. Hg pressure. After repeated fractionation the ester has a boiling point of 87–88° C. at 0.05 mm. Hg pressure.

(d) *3-Ethyl-4-Methyl-Thiophencarboxylic Acid-(2)*

18.4 grams of 3-ethyl-4-methyl thiophencarboxylic acid-2-methyl ester and 100 cc. of a 4 N aqueous sodium hydroxide solution are heated under reflux. After one hour the oil is completely dissolved. The cooled solution is filtered and acidified with dilute hydrochloric acid. The thick yellow precipitate is vacuum filtered and dried. There are obtained 16 grams of 3-ethyl-4-methyl-thiopen-carboxylic acid-(2). After recrystallization from dilute methanol the compound melts at 111–112° C.

EXAMPLE 4

(a) *2-[(Carbomethoxy-Methylmercapto)-Methylene]-Pentanone-(3)*

11.4 grams (0.1 mol) of hydroxymethylene-diethylketone are mixed with 10.6 grams (0.1 mol) of thioglycolic acid-methyl ester, and 1 droplet of concentrated hydrochloric acid is added. In order to complete the reaction, the whole is heated to 90° C. for a short time. After cooling, the water that has formed is eliminated by subjecting the mixture to a vacuum. The product is then distilled in vacuo. There are obtained 15 grams of a light yellow oily liquid having a boiling point of 132–136° C. under 0.1 mm. Hg pressure. After repeated distillation the substance distils at 133° C. under a pressure of 0.1 mm. Hg.

2,4-dinitrophenylhydrazone: Copper-red scales (from acetic ester), boiling point 161–162° C.

(b) *3-Ethyl-4-Methyl-Thiophencarboxylic Acid-(2)*

10.1 grams of 2-[(carbomethoxy-methylmercapto)-methylene]-pentanone-(3) are dissolved in 10 cc. of methanol, and to this solution are added 30 cc. of a 2 N methanolic sodium methylate solution. The whole is then heated under reflux for 15 minutes. After addition of 30 cc. of a 2 N aqueous sodium hydroxide solution, the solution is further heated to the boil for half an hour, the reflux boiling apparatus being then provided with an ascending tube. After having allowed the solution to cool, it is acidified with dilute hydrochloric acid and the separated acid is vacuum filtered. After drying there are obtained 4.7 grams of 3-ethyl-4-methyl-thiophencarboxylic acid-(2). After recrystallization from dilute methanol the compound has a melting point of 111–112° C.

EXAMPLE 5

(a) *1-[Bis-(Carboxy-Methylmercapto)-Methyl]-Cyclo-Hexanone-(2)*

25 grams (0.2 mol) of 1-hydroxymethylene-cyclohexanone-(2) are mixed with 36.8 grams (0.4 mol) of anhydrous thioglycolic acid. Thereby the temperature increases within 5 minutes to about 75° C. After having been allowed to stand for one day the viscous yellow product solidifies in crystalline form. For purification the product is treated with a little ether and then sucked off. The are obtained 54.2 grams of 1-[bis-(carboxy-methylmercapto)-methyl]-cyclohexanone-(2) which can be recrystallized from acetic ester and has then a melting point of 119–123° C.

(b) *1-[Bis-(Carbomethoxy-Methylmercapto)-Methyl]-Cyclohexanone-(2)*

29.2 grams of 1-[bis-(carboxy-methylmercapto)-methyl]-cyclohexanone-(2) are dissolved in a mixture of 40 cc. of methanol and 15 cc. of water, and to this solution are added 2 cc. of concentrated sulfuric acid. After some hours the solution becomes turbid, and, after having been allowed to stand for 1 day, segregates into 2 layers. Water and methylene chloride are added, the methylene chloride phase is separated, washed with water, dried over sodium sulfate, and the solvent is then distilled off in increasing the temperature to about 100° C. and using a pressure of 12 mm. Hg. There are obtained 30.4 grams of 1-[bis-(carbomethoxy-methylmercapto)-methyl]-cyclohexanone-(2) in the form of a thick oil having a light orange color.

The attempt to distil the product yields 1-[(carbomethoxy - methylmercapto)-methylene]-cyclohexanone-(2) under separation of thioglycolic acid ester.

($c_1$) *3,4-Tetramethylene-Thiophencarboxylic Acid-2-Methyl Ester*

32 grams of 1-[bis-(carbomethoxy-methylmercapto)- methyl]-cyclohexanone-(2) are mixed with 30 cc. of methanol, and the mixture is poured into a solution of 5 grams of sodium metal in 100 cc. of methanol. The solution is thereby getting a red-orange tint while the temperature increases. Heating under reflux is continued for further 15 minutes and after having been allowed to cool and to stand for 1 hour the mixture is diluted with a large amount of ice-water. To the reaction mixture are then added hydrochloric acid and methylene chloride, the layers are separated, the aqueous layer is shaken again with methylene chloride, the collected methylene chloride solutions are washed with water, dried over sodium sulfate, and the solvent is distilled off. Upon distillation under reduced pressure there are obtained 11.9 grams of 3,4-tetramethylene-thiophencarboxylic acid-2-methyl ester in the form of a yellowish oil having a boiling point of 126–127° C. under a pressure of 0.1 mm. Hg. After repeated distillation the substance passes over at a temperature of 115° C. under 0.05 mm. Hg pressure. Upon trituration the ester solidifies to form crystals. By recrystallization from methanol there are obtained colorless crystals having a melting point of 25° C.

($c_2$) *3,4-Tetramethylene-Thiophencarboxylic Acid-2-Methyl Ester*

12 grams of sodium methylate are suspended in 120 cc. of dry ether, and a solution of 32 grams of 1-[bis-(carbomethoxy - methyl-mercapto)-methyl]-cyclohexanone-(2) in 50 cc. of ether is added dropwise within half an hour, while stirring and cooling with ice. After having continued stirring for 6 hours, water is added, the ether solution is separated, washed with water, dried over sodium sulfate, and the solvent is finally evaporated. By distillation there are obtained 6.3 grams of 3,4-tetramethylene-thiophencarboxylic acid-2-methyl ester having a boiling point of 126–127° C. under 0.1 mm. Hg pressure.

(*d*) *3,4-Tetramethylene-Thiophencarboxylic Acid-(2)*

19.6 grams of 3,4-tetramethylene-thiophencarboxylic acid-2-methyl ester are heated under reflux for half an hour with 100 cc. of a 4 N aqueous sodium hydroxide solution. The ester is thereby completely dissolved. After having cooled, the ester is poured into dilute hydrochloric acid whereupon the free 3,4-tetramethylene-thiophencarboxylic-2-acid separates out. After sucking off and drying there are obtained 17.4 grams of said compound. After being recrystallized from methanol it melts at 205–206° C.

EXAMPLE 6

(*a*) *1-[Bis-(Carbethoxy-Methylmercapto)-Methyl]-Cyclohexanone-(2)*

29.2 grams of 1-[bis-(carboxy-methylmercapto)-methyl]- cyclohexanone-(2) (prepared according to the method described in Example 5) are dissolved in a mixture of 40 cc. of ethanol and 15 cc. of water, and to this solution are added 2 cc. of concentrated sulfuric acid. After the mixture has been allowed to stand for 1 day, water and methylene-chloride are added to the reaction mixture, the methylene chloride is washed with water, dried over sodium sulfate and distilled. There remain behind 32 grams of 1-[bis-(carbethoxy-methylmercapto)-methyl]-cyclohexanone-(2).

(*b*) *3,4-Tetramethylene-Thiophencarboxylic Acid-2-Ethyl Ester*

32 grams of crude 1-[bis-(carbethoxy-methylmercapto)-methyl]-cyclohexanone-(2) are mixed with 30 cc. of ethanol, and the mixture is poured into 100 cc. of a 2 N ethanolic sodium ethylate solution. The whole is heated under reflux for 15 minutes, allowed to cool and to stand for one hour, and ice-water, dilute hydrochloric acid and methylene chloride are then added. The organic layer is washed with water, dried and finally the solvent is distilled off. Upon distillation in vacuo there are obtained 12.2 grams of 3,4-tetramethylene-thiophencarboxylic acid-2-ethyl ester having a boiling point of 136–137° C. under 0.1 mm. Hg pressure. Upon repeated fractionation the slightly yellow oil is obtained as a colorless oil boiling at 118° C. under a pressure of 0.05 mm. Hg.

EXAMPLE 7

(*a*) *1-[(Carbomethoxy-Methylmercapto)-Methylene]-Cyclohexanone-(2)*

To 12.6 grams of 1-hydroxy-methylene-cyclohexanone-(2) are added 10.6 grams of thioglycolic acid-methyl ester and 2 droplets of concentrated hydrochloric acid. The temperature rises within 5 minutes to about 40° C. The water that has formed is removed by subjecting the mixture to a vacuum. Upon distillation in vacuo there are obtained 17.5 grams of 1-[(carbomethoxy-methylmercapto)-methylene]-cyclohexanone-(2) having a boiling point of 150–155° C. under 0.05 mm. Hg pressure with slight decomposition occuring. After repeated distillation the product is obtained in the form of a colorless oil boiling at 140° C. under a pressure of 0.01 mm. Hg.

2,4-dinitro-phenylhydrazone: violet crystals (from acetic ester), melting point 145–146° C.

(*b*) *3,4-Tetramethylene-Thiophencarboxylic Acid-2-Methyl Ester*

10.7 grams of 1-[(carbomethoxy-methylmercapto)-methylene]-cyclohexanone(2) are diluted with 10 cc. of methanol and then poured into 30 cc. of a 2 N methanolic sodium methylate solution. The mixture is heated under reflux for 15 minutes and, after having cooled, is allowed to stand for one hour; a large quantity of ice-water, dilute hydrochloric acid and methylene chloride are then added, the organic layer is separated, dried over sodium sulfate and finally the solvent is distilled off. Upon distillation in vacuo there are obtained 5.5 grams of 3,4-tetramethylene-thiophencarboxylic acid-2-methyl ester having a boiling point of 126–127° C. under a pressure of 0.1 mm. Hg.

EXAMPLE 8

(*a*) *β,β-Bis-(Carboxy-Methylmercapto)-α-Methyl-Propiophenone*

36.8 grams of anhydrous thioglycolic acid are added to 32 grams of hydroxymethylene-propiophenone, and the mixture is heated to 80° C. After addition of 2 droplets of concentrated hydrochloric acid the temperature rises by itself to 90° C. β,β-bis-(carboxy-methylmercapto)-α-methyl-propiophenone is thereby formed; it constitutes a thick oil which is further processed without purification.

(*b*) *β,β-Bis-(Carbomethoxy-Methylmercapto)-α-Methyl-Propiophenone*

The crude β,β-bis-(carboxy-methylmercapto)-α-methyl-propiophenone (obtained in the manner described in Example 8*a*) is dissolved in a mixture of 80 cc. of methanol and 30 cc. of water, and to the solution are added 4 cc. of concentrated sulfuric acid. After having been allowed to stand for 1 day, the mixture has separated into 2 layers. Water and methylene chloride are then added, the organic layer is separated, dried over sodium sulfate, and the solvent is distilled off in the vacuum under a pressure of 12 mm. Hg and at a temperature that has been increased to 100° C. There are obtained 59 grams of β,β-bis-(carbomethoxy-methylmercapto)-α-methyl-propiophenone in the form of a thick, light yellow oil, which cannot be distilled without decomposition and which is, therefore, further reacted without being purified.

(*c*) *3-Phenyl-4-Methyl-Thiophencarboxylic Acid-2-Methyl Ester*

59 grams of the crude β,β-bis-(carbomethoxy-methylmercapto)-α-methyl propiophenone are dissolved in 30 cc.

of methanol and the solution thus obtained is added to 200 cc. of a 2 N methanolic sodium methylate solution. The mixture is heated under reflux for 15 minutes, and allowed to stand for 1 hour at room temperature; 500 cc. of water are then added, the whole is acidified with dilute hydrochloric acid, and the separated oil is taken up in methylene chloride. After having dried the methylene chloride phase and distilled off the solvent, the residue is distilled in a vacuum. 30.2 grams of 3-phenyl-4-methyl-thiophencarboxylic acid-2-methyl ester are obtained having a boiling point of 142–159° C. under a pressure of 0.1 mm. Hg. After repeated fractionation the substance is obtained in the form of an almost colorless oil having a boiling point of 137° C. under a pressure of 0.05 mm. Hg.

(d) *3-Phenyl-4-Methyl-Thiophencarboxylic Acid-(2)*

23.2 grams of 3-phenyl-4-methyl-thiophencarboxylic acid-2-methyl ester are heated under reflux with 100 cc. of a 4 N aqueous sodium hydroxide solution. After about 40 minutes the oil is dissolved. Upon cooling, the sodium salt of the acid precipitates in the form of glittering scales. It is vacuum filtered and can be recrystallized from water. From the solution of the salt in warm water, the 3-phenyl-4-methyl-thiophencarboxylic acid-(2) precipitates upon addition of dilute hydrochloric acid. The yield is 20.3 grams. The acid is recrystallized from dilute methanol in the form of colorless scales melting at 167–168° C.

EXAMPLE 9

(a) *α-[(Carbomethoxy-Methylmercapto)-Methylene]-Propiophenone*

10.6 grams of thioglycolic acid-methyl ester are added to 16.2 grams of hydroxymethylene-propiophenone and heated to 80° C. in a distilling flask.

Upon addition of 2 droplets of concentrated hydrochloric acid the temperature rises by itself to 90° C. On cooling, the clear solution becomes turbid by the water that separates out. After having been allowed to stand for one hour, the water is removed by subjecting the whole to reduced pressure, and subsequently the content of the flask is distilled in the vacuum. At the boiling point of 180–182° C. under a pressure of 0.1 mm. Hg 19 grams of α-[(carbomethoxy-methylmercapto)-methylene]-propiophenone pass over. After repeated distillation, the thick oil has a boiling point of 170° C. under a pressure of 0.05 mm. Hg, and it solidifies upon trituration. One recrystallization from methanol the compound is obtained in the form of colorless sheets melting at 66–67° C.

(b) *3-Phenyl-4-Methyl-Thiophencarboxylic Acid-(2)*

To 12.5 grams of α-[(carbomethoxy-methylmercaptomethylene]-propiophenone there are added 25 cc. of methanol and 50 cc. of a 2 N methanolic sodium methylate solution. The mixture is then heated under reflux for 15 minutes and allowed to stand for one hour at room temperature. Thereupon 50 cc. of a 2 N aqueous sodium solution are added, and, after having installed a short ascending tube, the whole is heated to the boil for a further hour. The solution from which, on cooling, the sodium salt of the 3-phenyl-4-methyl-thiophene-carboxylic acid-(2) precipitates is acidified with dilute hydrochloric acid while still warm. After the product has been vacuum filtered and washed, there are obtained 6.9 grams of 3-phenyl-4-methyl-thiophencarboxylic acid-(2). After recrystallization from dilute methanol the melting point of this compound is 167–168° C.

EXAMPLE 10

(a) *β,β-Bis-(Carboxy-Methylmercapto)-(p-Methyl)-Propiophenone*

To a mixture of 16.2 grams of hydroxymethylene-p-methyl-aceto-phenone and 18.4 grams of anhydrous thioglycolic acid there are added two droplets of concentrated hydrochloric acid. Within 2 minutes the temperature of the mixture increases to about 50° C. After having been allowed to stand for some days, the reaction mixture solidifies to form a yellow crystal mass. The yield is almost quantitative. The crude product can be purified by recrystallization from acetic ester and petroleum ether. The β,β-bis-(carboxy-methylmercapto)-(p-methyl)-propiophenone is obtained in the form of colorless crystals melting at 106–108° C.

(b) *β,β-Bis-(Carbomethoxy-Methylmercapto)-(p-Methyl)-Propiophenone*

The so obtained crude β,β-bis-(carboxy-methylmercapto)-(p-methyl)-propiophenone is dissolved in a mixture of 40 cc. of methanol and 15 cc. of water, and to the solution are added 2 cc. of concentrated sulfuric acid. After one day the reaction mixture has separated into 2 layers. Water and methylene chloride are then added to the reaction mixture. The organic layer is dried over sodium sulfate and the solvent is then distilled off in a water-jet vacuum while raising the temperature up to 100° C. There remain behind 30.3 grams of crude β,β-bis-(carbomethoxy-methylmercapto)-(p-methyl)-propiophenone in the form of a thick orange-yellow oil which decomposes when subjected to a distillation.

(c) *3-(p-Tolyl)-Thiophencarboxylic Acid-2-Methyl Ester*

30.3 grams of crude β,β-bis-(carbomethoxy-methylmercapto)-(p-methyl)-propiophenone are mixed with 20 cc. of methanol and then added to a 2 N methanolic sodium methylate solution. The whole is heated under reflux for 15 minutes and then allowed to stand for one hour at room temperature. Water is then added to the red solution and the oil that forms upon acidification with dilute hydrochloric acid is taken up with methylene chloride. After having dried over sodium sulfate and distilled off the solvent, the residue is distilled in vacuo, while 5.6 grams of 3-(p-tolyl)-thiophencarboxylic acid-2-methyl ester having a boiling point of 165–169° C. under 0.2 mm. Hg pressure pass over. After repeated distillation the ester is obtained in the form of a thick, almost colorless oil boiling at 148–150° C. under a pressure of 0.1 mm. Hg.

(d) *3-(p-Tolyl)-Thiophencarboxylic Acid-(2)*

4.65 grams of 3-(p-tolyl)-thiophencarboxylic acid-2-methyl ester are heated under reflux for one hour together with 20 cc. of a 4 N aqueous sodium hydroxide solution. 20 cc. of water are then added and the whole is further boiled for half an hour during which time the oil is almost completely dissolved. After having filtered off some flocks, the still warm solution is acidified with dilute hydrochloric acid. After vacuum filtration and drying there are obtained 3.85 grams of 3-(p-tolyl)-thiophencarboxylic acid-(2), which crystallizes from benzene in the form of fine colorless needles melting at 175° C.

EXAMPLE 11

(a) *β,β-Bis-(Carboxy-Methylmercapto)-(p-Methoxy)-Propiophenone*

To 17.8 grams of hydroxymethylene-p-methoxy-acetophenone are added 18.4 grams of anhydrous thioglycolic acid and 2 droplets of concentrated hydrochloric acid. The temperature of the reaction mixture thereby rises within a few minutes to about 55° C. After having been allowed to stand for some days the thick oil solidifies to a yellow crystal mass. The crude product can be purified by recrystallization from a mixture of acetic ester and petrol ether. It is obtained in the form of colorless crystals melting at 110–112° C.

(b) *β,β-Bis-(Carbomethoxy-Methylmercapto)-(p-Methoxy)-Propiophenone*

34 grams of crude β,β-bis-(carboxy-methylmercapto)-

(p-methoxy)-propiophenone are dissolved in 14 cc. of methanol and 15 cc. of water, and 2 cc. of concentrated sulfuric acid are added to the solution. After having been allowed to stand for one day, water and methylene chloride are added, the organic layer is dried over sodium sulfate and the methylene chloride is distilled off in a water-jet vacuum while increasing the temperature to about 100° C. There remain behind 35 grams of crude β,β - bis - (carbomethoxy - methylmercapto) - p - methoxy) - propiophenone which is reacted without further purification.

(c) 3-(p-Anisyl)-Thiophencarboxylic Acid-2-Methyl Ester 35 grams of crude β,β-bis-(carbomethoxy-methylmercapto)-(p-methoxy)-propiophenone are added, after having been mixed with 20 cc. of methanol, to 100 cc. of a 2 N methanolic sodium methylate solution. The mixture is heated to the boil for 15 minutes and then allowed to stand for one hour at room temperature. Water is then added to the red solution which is subsequently acidified with dilute hydrochloric acid. A yellow oil separates out which, after decanting of the water, crystallizes upon trituration with methanol. By recrystallization from methanol there are obtained 5.9 grams of 3-(p-anisyl)-thiophencarboxylic acid-2-methyl ester in the form of colorless needles melting at 102° C.

(d) 3-(p-Anisyl)-Thiophencarboxylic Acid-(2)

5 grams of 3-(p-anisyl)-thiophencarboxylic acid-2-methyl ester and 20 cc. of a 4 N aqueous sodium hydroxide solution are heated under reflux for one hour. After addition of 20 cc. of water, heating to the boil is continued for a further half hour during which time the oil dissolves almost completely. Brown flocks that are present in the hot solution are filtered off, and the solution is acidified with dilute hydrochloric acid. Thereby the acid separates in the form of yellow flocks which are vacuum filtered and dried. There are obtained 4 grams of 3-(p-anisyl)-thiophencarboxylic acid-(2) which crystallizes from benzene in the form of colorless needles melting at 170–171° C.

EXAMPLE 12

(a) [(Carbomethoxy-Methylmercapto)-Methylene]-Acetophenone 8.1 grams of methoxymethylene-acetophenone are mixed with 5.3 grams of thioglycolic acid-methyl ester, and the mixture is heated to 100° C. in a water bath. Upon addition of 2 droplets of concentrated hydrochloric acid the liquid begins to boil, and 13 grams of methanol distil off. Distillation of the residue under reduced pressure yields 11.6 grams of [(carbomethoxy-methylmercapto)-methylene]-acetophenone in the form of a bright yellow thick oil having a boiling point of 195–200° C. under a pressure of 0.5 mm. Hg.

2,4-dinitro-phenylhydrazone: red crystals (from acetic ester), melting point 148–149° C.

(b) β,β-Bis-(Carbomethoxy-Methylmercapto)-Propiophenone

A mixture of 16.2 grams of methoxymethylene-acetophenone and 21.2 grams of thioglycolic acid-methyl ester is heated to 100° C. in a water bath. After addition of 2 droplets of concentrated hydrochloric acid the liquid begins to boil and 3 grams of methanol distil off. By subjecting the whole to reduced pressure 2 grams of unreacted thioglycolic acid - methyl ester are eliminated. There remain behind 32 grams of β,β-bis-(carbomethoxy-methylmercapto)-propiophenone in the form of a viscous yellow oil.

Distillation in a high vacuum yields [(carbomethoxy-methylmercapto)-methylene]-acetophenone under separation of 1 mol of thioglycolic acid-methyl ester.

(c) 3-Phenyl-Thiophencarboxylic Acid-2-Methyl Ester

A mixture of 34.2 grams of crude β,β-bis-(carbomethoxy-methylmercapto)-propiophenone and 100 cc. of a 2 N methanolic sodium methylate solution are heated under reflux for 15 minutes. On cooling, glittering crystals precipitate; precipitation of these crystals is completed by adding 100 cc. of water. After the crystals have been vacuum filtered and washed there are obtained 3.9 grams of 3-phenyl-thiophencarboxylic acid-2-methyl ester. By recrystallization from methanol of 80% strength the compound is obtained in the form of colorless flakes melting at 119° C.

The ring closure to 3-phenyl-thiophencarboxylic acid-2-methyl ester can also be effected by treating [(carbomethoxy - methylmercapto) - methylene]-acetophenone as starting substance with a 2 N methanolic sodium methylate solution or a 2 N methanolic potash lye or with dry sodium methylate in ether. The yields are the same.

(d) 3-Phenyl-Thiophencarboxylic Acid-(2)

3.3 grams of 3-phenyl-thiophencarboxylic acid-(2)-methyl ester and 10 cc. of 4 N aqueous sodium hydroxide solution are heated under reflux for half an hour. The clear solution is allowed to cool and then acidified with dilute hydrochloric acid. After having vacuum filtered and dried the precipitate, there are obtained 2.8 grams of 3-phenyl-thiophencarboxylic acid-(2). By recrystallization from dilute methanol the compound is obtained in the form of colorless flakes melting at 205–206° C.

EXAMPLE 13

(a) 1,1-Bis-(Carbomethoxy-Methylmercapto)-Butanone-(3)

66 grams of β-keto-butyraldehyde-dimethylacetal are mixed with 106 grams of thioglycolic acid-methyl ester, and the mixture is heated to 100° C. Upon addition of 2 droplets of concentrated hydrochloric acid the content of the flask begins to boil, and 23 grams of methanol distil off within 45 minutes. The remaining amounts of methanol and about 2 grams of unreacted thioglycolic acid-methyl ester are eliminated by subjecting the whole to a water-jet vacuum. There remain behind 137 grams of 1,1-bis-(carbomethoxy-methylmercapto)-butanone-(3) in the form of a red oil which does not crystallize and which is reacted without further purification.

When distilled in vacuo, [(carbomethoxy-methylmercapto)-methylene]-acetone passes over under separation of thioglycolic acid-methyl ester. The unsaturated thioether has a boiling point of 116–118° C. under a pressure of 0.1 mm. Hg.

2,4-dinitro-phenylhydrazone: red needles (from methanol), melting point 134° C.

(b) 3-Methyl-Thiophencarboxylic Acid-2-Methyl Ester

A solution of 56 grams of 1,1-bis-(carbomethoxy-methylmercapto)-butanone-(3) in 50 cc. of methanol is poured into 200 cc. of a 2 N methanolic sodium methylate solution; the mixture is then heated under reflux for 15 minutes and, after having cooled, 1 liter of water is added. The solution is then acidified with dilute hydrochloric acid and the oil that has separated is taken up in methylene chloride. After having dried the extract of methylene chloride over sodium sulfate and after having separated the solvent by distillation, the residue is distilled in vacuo.

Thereby 15.3 grams of 3-methyl-thiophencarboxylic acid-2-methyl ester having a boiling point of 47 to 70° C. under a pressure of 0.1 mm. Hg pass over in the form of a colorless liquid. After repeated fractionation in a water-jet vacuum the ester has a boiling point of 101° C. under 12 mm. Hg pressure.

(c) 3-Methyl-Thiophencarboxylic Acid-2-Methyl-Ester 56 grams of 1,1-bis-(carbomethoxy-methylmercapto)- butanone-(3) are dissolved in 50 cc. of ether, and the solution is added dropwise within one hour while cooling with ice, to a suspension of 22 grams of sodium methylate in 200 cc. of ether. Stirring is then continued for one hour while cooling with ice, and for another hour at room temperature. Water and dilute hydrochloric acid are then added to the reaction mixture, and the ethereal layer is separated. After washing with water and drying over sodium sulfate, the solvent is distilled off. On distillation of the residue in vacuo 14.4 grams of 3-methyl-thiophencarboxylic acid-2-methyl ester pass over at the boiling point of 50–70° C. in the form of a bright yellow liquid. After repeated fractionation the ester boils at the boiling point of 47–48° C. under a pressure of 0.1 mm. Hg.

(d) *3-Methyl-Thiophencarboxylic Acid-(2)*

15.6 grams of 3-methyl-thiophencarboxylic acid-2-methyl ester and 100 cc. of 4 N aqueous sodium hydroxide solution are heated under reflux for one hour; the oil dissolves completely during this period. The mixture is allowed to cool and is then acidified with dilute hydrochloric acid. After the precipitate has been vacuum filtered and dried, there are obtained 13.4 grams of 3-methyl-thiophencarboxylic acid-(2). The compound crystallizes from water in small colorless needles melting at 144–145° C.

EXAMPLE 14

(a) *1,1-Bis-(Carbethoxy-Methylmercapto)-Butanone-(3)*

66 grams of β-keto-butyraldehyde-dimethylacetal are mixed with 120 grams of thioglycolic acid-ethyl ester, and the mixture is heated to 100° C. After addition of 2 droplets of concentrated hydrochloric acid the liquid begins to boil. Within one hour about 21 grams of methanol pass over. The remaining portion is eliminated by subjecting the whole to a water-jet vacuum. There remain behind 151 grams of 1,1-bis-(carbethoxy-methylmercapto)-butanone-(3) in the form of a light yellow thick oil which is further processed without purification.

When distilling the mercaptal, [(carbethoxy-methylmercapto)-methylene]-acetone passes over with separation of thioglycolic acid-ethyl ester. It has a melting point of 120–123° C. under a pressure of 0.1 mm. Hg. 2,4-dinitro-phenylhydrazone: red needles (from ethanol); melting point 121° C.

(b) *3-Methyl-Thiophencarboxylic Acid-2-Ethyl Ester*

A solution of 61.6 grams of 1,1-bis-(carbethoxy-methylmercapto)-butanone-(3) in 50 cc. of ethanol is poured into 200 cc. of a 2 N sodium ethylate solution in ethanol. The mixture is heated under reflux for 15 minutes and, after having been allowed to cool, water is added, the whole is acidified with dilute hydrochloric acid, and the separated ester is taken up with methylene chloride. After drying and separating the solvent by distillation the residue is distilled under reduced pressure. Thereby are obtained 15.3 grams of 3-methyl-thiophencarboxylic acid-2-ethyl ester having a boiling point of between 55–70° C. under a pressure of 0.2 mm. Hg. After repeated fractionation in a water-jet vacuum the ester has a boiling point of 108–109° C. under a pressure of 12 mm. Hg.

EXAMPLE 15

(a) *1,1-Bis-(Carbomethoxy-Methylmercapto)-5-Methyl-Hexanone-(3)*

A mixture of 17.4 grams of isovaleryl-acetaldehyde-dimethyl-acetal and 21.2 grams of thioglycolic acid-methyl ester is heated to 100° C. After addition of 2 droplets of concentrated hydrochloric acid the liquid begins to boil and gives off about 4 grams of methanol. At the end a water-jet vacuum is applied for a short period. There remain behind 32 grams of 1,1-bis-(carbomethoxy-methylmercapto)-5-methyl-hexanone-(3) in the form of a thick, almost colorless oil.

(b) *3-Isobutyl-Thiophencarboxylic Acid-2-Methyl Ester*

A mixture of 30 grams of 1,1-bis-(carbomethoxy-methylmercapto)-5-methyl-hexanone-(3) and 20 cc. of methanol is added to 100 cc. of a 2 N methanolic sodium methylate solution. The mixture is heated under reflux for 15 minutes, is allowed to stand subsequently for one hour at room temperature, ice-water and dilute hydrochloric acid is then added and the oil that has separated is taken up in methylene chloride. After drying over sodium sulfate and separation of the solvent by distillation, there are obtained upon distillation in vacuo 12.1 grams of 3-isobutyl-thiophencarboxylic acid-2-methyl ester having a boiling point of 78–82° C. under a pressure of 0.05 mm. Hg. Upon repeated fractionation there is obtained a colorless liquid boiling at 79° C. under 0.05 mm. Hg pressure.

(c) *3-Isobutyl-Thiophencarboxylic Acid-2-Methyl Ester*

A solution of 32 grams of 1,1-bis-(carbomethoxy-methylmercapto)-5-methyl-hexanone-(3) in ether is added dropwise within half an hour to a suspension of 11 grams of sodium methylate in 100 cc. of ether while cooling with ice. The reaction mixture is then stirred for 3 hours at room temperature and water and dilute hydrochloric acid are subsequently added. By working up in the usual manner there are obtained 9.3 grams of 3-isobutyl-thiophencarboxylic acid-2-methyl ester having a boiling point of between 78–83° C. under a pressure of 0.1 mm. Hg.

(d) *3-Isobutyl-Thiophencarboxylic Acid-(2)*

9.9 grams of 3-isobutyl-thiophencarboxylic acid-2-methyl ester are heated under reflux in 50 cc. of a 4 N aqueous sodium hydroxide solution. After about half an hour the oil is dissolved. When the solution has cooled, it is acidified with dilute hydrochloric acid, the precipitate is vacuum filtered, and after drying there are obtained 8 grams of 3-isobutyl-thiophencarboxylic acid-(2). It crystallizes from water/methanol in colorless needles melting at 84° C.

EXAMPLE 16

(a) *[(Carbethoxy-Methylmercapto)-Methylene]-Acetylacetone*

15.6 grams of ethoxymethylene-acetylacetone are mixed with 12 grams of thioglycolic acid-ethyl ester whereby the temperature increases within about 5 minutes to 50° C. By heating to 100° C. and subjecting the whole to a moderately reduced pressure the alcohol that has formed is removed. The reaction can be accelerated by adding 2 droplets of concentrated hydrochloric acid. On distillation under reduced pressure there are obtained 18.8 grams of [(carbethoxy-methylmercapto)-methylene]-acetylacetone in the form of a yellowish thick oil boiling at 151° C. under a pressure of 0.1 mm. Hg, which soon solidifies upon trituration. From a little ethanol the substance crystallizes in the form of colorless flakes melting at 43° C.

(b) *3-Methyl-4-Acetyl-Thiophencarboxylic Acid-2-Ethyl Ester*

11.5 grams of [(carbethoxy-methylmercapto)-methylene]-acetyl-acetone are dissolved in 30 cc. of hot ether, and the solution is added, while stirring, to a suspension of 3.5 grams of sodium ethylate in 50 cc. of ether. After one and one-half hours the red-brown salt is filtered off, dissolved in water, and this solution is again shaken with ether. After having washed the collected ether solution with dilute hydrochloric acid and having dried over sodium sulfate, the solvent is distilled off. There remain behind 5.1 grams of 3-methyl-4-acetyl-thiophencarboxylic acid-2-ethyl ester in the form of colorless needles. From the alkaline solution there can be recovered further 0.7 gram of the compound by acidification. After recrystallization from dilute ethanol the ester has a melting point of 89° C.

2,4 - dinitrophenyl - hydrazone: Orange-red needles (from acetic ester); melting point 194° C.

EXAMPLE 17

(a) *[(Carboxy-Methylmercapto)-Methylene]-Acetylacetone*

15.6 grams of ethoxymethylene - acetylacetone are mixed with 9.2 grams of anhydrous thioglycolic acid whereby the temperature rises within one minute to about 55° C. By addition of one droplet of concentrated hydrochloric acid, the course of the reaction is accelerated. After having been allowed to stand for one hour, the oil solidifies to a crystal mass which is triturated with a small quantity of benzene and then sucked off. Thereby are obtained 17.6 grams of [(carboxy-methylmercapto)-methylene]-acetylacetone. By recrystallization from benzene the compound is obtained in the form of clogged up colorless needles melting at 112–113° C.

(b) *[(Carbomethoxy-Methylmercapto)-Methylene]-Acetylacetone*

10.1 grams of [(carboxy-methylmercapto)-methylene]-acetylacetone are dissolved in 20 cc. of methanol and 7 cc. of water, and 1 cc. of concentrated sulfuric acid is added to the solution. After having allowed the mixture to stand for one day, water and methylene chloride are added. By working up in the usual manner there is obtained [(carbomethoxy-methylmercapto)-methylene]-acetylacetone in a yield of 85%. It constitutes a light yellow thick oil boiling at 141° C. under a pressure of 0.01 mm. Hg which crystallizes after some time. From a small quantity of methanol the substance crystallizes in the form of colorless needles melting at 71° C.

(c) *[(Carbomethoxy-Methylmercapto)-Methylene]-Acetylacetone*

15.6 grams of ethoxymethylene - acetylacetone are mixed with 10.6 grams of thioglycolic acid-methyl ester. Thereby the temperature rises within about 5 minutes to 60° C. By heating to 100° C. under slightly reduced pressure the alcohol that has formed is removed. The reaction proceeds faster if one droplet of concentrated hydrochloric acid is added. Upon distillation of the crude products in a vacuum there are obtained 19.7 grams of [(carbomethoxy-methylmercapto)-methylene]-acetylacetone in the form of a light yellow thick oil boiling at 159° C. under 0.2 mm. Hg pressure, which solidifies in crystalline form after some time. From methanol the compound crystallizes in the form of colorless needles melting at 71° C.

(d) *3-Methyl-4-Acetyl-Thiophencarboxylic Acid-2-Methyl Ester*

A solution of 21.6 grams of [(carbomethoxy-methylmercapto)-methylene]-acetylacetone in 50 cc. of ether is added to a suspension of 6 grams of sodium methylate in 70 cc. of ether. The mixture is stirred for one and one-half hours at room temperature, and the brown precipitate is vacuum filtered, dissolved in water, and this solution is extracted with ether. The collected ether solutions are washed with dilute acid. After having dried over sodium sulfate and distilled off the solvent, there remain behind 10.3 grams of 3-methyl-4-acetyl-thiophencarboxylic acid-2-methyl ester. Further 2 grams of the compound can be recovered from the brown alkaline solution by isolation. The crude product is preferably purified by distillation in a sausage flask (Anschütz distillation flask) where it passes over at 108° C. under a pressure of 0.1 mm. Hg. From methanol the ester crystallizes in the form of thick needles melting at 69.5° C.

2,4 - dinitro - phenylhydrazone: Orange-yellow needles (from acetic ester); melting point 213–214° C.

(e) *3-Methyl-4-Acetyl-Thiophencarboxylic Acid-2-Methyl Ester*

21.6 grams of [(carbomethoxy-methylmercapto)-methylene]acetyl-acetone are dissolved in 30 cc. of methanol, and to this solution are added 60 cc. of a 2 N methanolic sodium methylate solution. The mixture is heated under reflux for 15 minutes and is allowed to stand at room temperature for 2 hours. Water and dilute hydrochloric acid are then added and the oil that has precipitated is taken up with methylene chloride. After having dried the methylene chloride solution over sodium sulfate and after having evaporated the solvent, the residue is distilled under reduced pressure whereby the 3-methyl-4-acetyl-thiophencarboxylic acid-2-methyl ester passes over in the form of a bright yellow oil having a boiling point of 115–122° C. under 0.2 mm. Hg pressure and in a yield of 11.1 grams. Upon trituration in the cold the substance crystallizes.

(f) *3-Methyl-4-Acetyl-Thiophencarboxylic Acid-(2)*

6 grams of 3-methyl-4-acetyl-thiophencarboxylic acid-2-methyl ester are heated under reflux with a solution of 10 grams of potassium hydroxide in 40 cc. of water for 15 minutes, whereby the oil is completely dissolved. After the whole has been cooled, it is filtered, acidified with dilute hydrochloric acid, and the precipitate that has formed is sucked off. There are obtained 5.5 grams of 3-methyl-4-acetyl-thiophencarboxylic acid-(2), which crystallizes from water in long colorless needles melting at 188–190° C.

EXAMPLE 18

(a) *Acetylacetone-Bis-Acetic Acid-Mercaptol*

While cooling with a mixture of ice and common salt dry hydrochloric acid gas is introduced into a mixture of 50 grams of acetyl-acetone and 92 grams of anhydrous thioglycolic acid. After 15 to 20 minutes a bright yellow, very viscous liquid is formed which is suitably poured into a porcelain dish. After a short period it solidifies yielding a hard crystal mass.

This crude product can be dried in the desiccator over sodium hydroxide and, for further purification, be recrystallized from acetic-acid-ethyl ester. The colorless crystals melt at 93° C. The yield is 130 grams.

(b) *Acetylacetone-Bis-Acetic Acid Methyl Ester-Mercaptol*

133.2 grams of acetylacetone-bis-acetic acid-mercaptol are dissolved in 180 cc. of methanol of 80% strength. 15 cc. of concentrated sulfuric acid are added, and the mixture is allowed to stand over night in a separating funnel. The ester separates in the form of a yellowish layer and is drawn off. The methanolic layer is diluted with 0.5 liter of water and then extracted by shaking with methylene chloride. Ester and the extract of methylene chloride are combined, washed once with a bicarbonate solution and twice with water, and dried over sodium sulfate. After distilling off the methylene chloride, there are obtained 139 grams of crude acetyl-acetone-bis-acetic acid methyl ester-mercaptol. Distillation in vacuo (boiling point 165° C. under a pressure of 0.2 mm. Hg) is accompanied by decomposition.

(c) *3,5-Dimethyl-Thiophen-2-Carboxylic Acid-Methyl Ester*

500 cc. of a 2 N sodium methylate solution in methanol are added to 147.2 grams of crude acetylacetone-bis-acetic acid methyl ester-mercaptol, and the whole is heated under reflux for 20 minutes. After the mixture has been allowed to cool, it is mixed with 1.5 liters of water and acidified with glacial acetic acid. It is then extracted by shaking with methylene chloride and dried over sodium sulfate. The 3,5-dimethyl-thiophen-2-carboxylic acid methyl ester is purified by distillation under reduced pressure and is obtained in the form of a colorless liquid having a boiling point of 115–119° C. under 12 mm. Hg pressure and in a yield of 61.5 grams.

(d) *3,5-Dimethylthiophen-2-Carboxylic Acid*

51 grams of 3,5-dimethylthiophen-2-carboxylic acid methyl ester are heated under reflux for about one hour with 150 cc. of a 4 N aqueous potassum hydroxide solution, whereby the ester dissolves after a short period. After the solution has been allowed to cool, it is poured into semi-concentrated hydrochloric acid whereupon 3,5-di-methylthiophen-2-carboxylic acid separates out. After vacuum filtration and washing with water the product is recrystallized from dilute methanol. There are obtained 41.2 grams of 3,5-dimethylthiophen-2-carboxylic acid in the form of colorless needles melting at 171° C.

EXAMPLE 19

(a) *3-Methyl-Acetylacetone-Bis-Acetic Acid-Mercaptol*

22.8 grams of 3-methyl-acetylacetone are mixed with 36.8 grams of anhydrous thioglycolic acid in introducing dry hydrogen chloride, while cooling simultaneously by means of a mixture of ice and common salt. After 20 to 25 minutes a viscous yellowish mass has formed which crystallizes after some time.

By allowing the product to stand over potassium hydroxide in a desiccator it can be purified from adhering water and hydrogen chloride. By recrystallization from ethyl acetate there are obtained colorless needles melting at 109° C.

(b) *3-Methyl-Acetylacetone-Bis-Acetic Acid Methyl Ester-Mercaptol*

50 grams of 3-methyl-acetylacetone-bis-acetic acid-mercaptol are dissolved in 180 cc. of methanol of 70% strength, 10 cc. of concentrated sulfuric acid are added, and the reaction mixture is allowed to stand over night in a separating funnel. About 500 cc. of water are then added, and the whole is extracted by shaking with methylene chloride. The methylene chloride solution is washed with a bicarbonate solution and water and dried over sodium sulfate. After the solvent has been distilled off, there are obtained 48.5 grams of crude 3-methyl-acetyl-acetone-bis-acetic acid-methyl ester-mercaptol which cannot be distilled because of strong decomposition.

(c) *3,4,5-Trimethyl-Thiophen-2-Carboxylic Acid Methyl Ester*

140 cc. of a 2 N sodium methylate solution in methanol are added to 30.8 grams of 3-methyl-acetylacetone-bis-acetic acid methyl ester-mercaptol, and the whole is heated under reflux for about 15 minutes. The reaction mixture is allowed to stand for several hours, and finally 1.5 liters of water are added, whereupon an almost colorless precipitate is separated. After slight acidification with acetic acid the precipitate is sucked off, washed with water and dried in a desiccator. The filtrate is extracted by shaking with methylene chloride. After washing with water, drying over sodium sulfate and distilling off the solvent, a further amount of the desired ester can be isolated. In all there are obtained 11.9 grams of 3,4,5-tri-methyl-thiophen-2-carboxylic acid methyl ester which can be easily recrystallized when dissolving it in a little methanol having a temperature of 20° C. and allowing the solution to stand in a mixture of ice and common salt. There are obtained colorless flakes melting at 53° C.

(d) *3,4,5-Trimethyl-Thiophen-2-Carboxylic Acid*

9.2 grams of 3,4,5-trimethyl-thiophen-2-carboxylic acid methyl ester are heated under reflux with 50 cc. of a 4 N aqueous potassium hydroxide solution, whereby dissolution is effected within one hour. After the solution has cooled, it is poured into half-concentrated hydrochloric acid, 8.3 grams of the acid precipitating thereby in the form of a flocky, colorless precipitate. By recrystallization from methanol there are obtained colorless needles melting at 209° C.

EXAMPLE 20

(a) *Benzoylacetone-Bis-Acetic Acid-Mercaptol*

32.4 grams of finely powdered benzoylacetone are dissolved as far as possible in 36.8 grams of anhydrous thioglycolic acid. A strong stream of dry hydrogen chloride is introduced into this suspension while cooling with a mixture of ice and common salt and under exclusion of moisture. After about 5 minutes the reaction mixture is present in the form of a clear solution, and after another 20 minutes a yellow-red, viscous liquid has formed which soon solidifies yielding a hard crystal mass.

In order to remove adhering hydrogen chloride and water the product is allowed to stand some days over potassium hydroxide in a desiccator. Upon recrystallization from formic acid or ethylacetate there are obtained colorless flakes melting at 118° C.; the yield is 64 grams.

(b) *Benzoylacetone-Bis-Acetic Acid Methyl Ester-Mercaptol*

65.7 grams of benzoylacetone-bis-acetic acid-mercaptol are dissolved in 150 cc. of methanol of 80% strength, and after addition of 15 cc. of concentrated sulfuric acid the reaction solution is allowed to stand over night in a separating funnel. The benzoyl-acetone-bis-acetic acid methyl ester-mercaptol deposes as lower, faintly yellow layer and can be drawn off. The methanolic layer is diluted with 500 cc. of water and then extracted by shaking with methylene chloride. The ester and the methylene-chloride are combined, washed with a bicarbonate solution and water, and finally dried. Upon distilling off the solvent there are obtained 66.7 grams of a crude product which cannot be distilled.

(c) *3-Phenyl-5-Methylthiophen-2-Carboxylic Acid-Methyl Ester*

100 cc. of a 2 N sodium methylate solution in methanol are added to 35.6 grams of benzoylacetone-bis-acetic acid methyl ester-mercaptol. While the reaction mixture develops heat and assumes a dark color, 3-phenyl-5-methylthiophen-2-carboxylic acid methyl ester separates in the form of a colorless, coarse crystalline precipitate. After cooling to 0° C. and neutralizing with acetic acid, the precipitate is vacuum filtered and washed with methanol of 80% strength. By adding water a further amount of the substance can be precipitated from the filtrate. In all, there are obtained 19.8 grams of 3-phenyl-5-methyl-thiophen-2-carboxylic acid methyl ester which can be purified by recrystallization from methanol; the colorless needles melt at 100° C.

(d) *3-Phenyl-5-Methyl-Thiophen-2-Carboxylic Acid*

200 cc. of a 2 N aqueous potassium hydroxide solution are poured over 23.2 grams of 3-phenyl-5-methyl-thiophen-2-carboxylic acid methyl ester, and the whole is heated under reflux. After about 2 hours a clear solution has formed which, after having been allowed to cool, is slowly poured into half-concentrated hydrochloric acid whereby the 3-phenyl-5-methyl-thiophen-2-carboxylic acid precipitates; the yield is 20 grams. By recrystallization from dilute methanol the compound is obtained in the form of colorless needles melting at 192° C.

I claim:

1. A process for making substituted thiophene-2-carboxylic acid esters of the formula

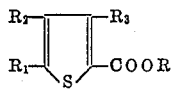

where $R_1$ is a member selected from the group consisting of hydrogen and lower alkyl, $R_2$ is a member selected from the group consisting of hydrogen, lower alkyl, and acetyl, $R_3$ is a member selected from the group consisting of lower alkyl, phenyl, tolyl, and anisyl, and R is lower alkyl, which comprises reacting one molar part of a member selected from the group consisting of 1-formyl-cyclohexanone-2 and β-dicarbonyl compounds of the formula

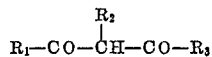

wherein $R_1$, $R_2$, and $R_3$ have their earlier significance, with from one to two molar parts of a compound of the formula $$HS—CH_2—COOR_4$$

wherein $R_4$ is a member selected from the group consisting of hydrogen and lower alkyl, whereby intermediate compounds having a formula selected from the group consisting of

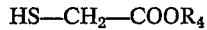

and

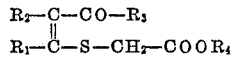

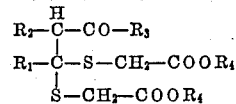

are formed, $R_1$, $R_2$, $R_3$, and $R_4$ having their earlier significance, esterifying carboxyl groups present with a lower alkanol, and effecting ring closure in the products thus obtained by contact with a condensation agent selected from the group consisting of sodium and potassium salts of saturated lower aliphatic alcohols, all steps being carried out at a temperature between 10° C. and 150° C.

2. A process as claimed in claim 1, wherein the compounds of the formula

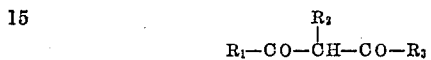

are used in the form of their acetals.

3. A process as claimed in claim 1, wherein the compounds of the formula

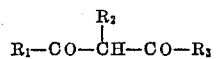

are used as their tautomeric hydroxy methylene compounds.

References Cited in the file of this patent

Hinsberg: Berichte deut. chem. Gesellschaft, vol. 43, pp. 901–906 (1910).

Noller: Textbook of Organic Chemistry, Second Edition, 1958, page 132.